United States Patent
Shirakawa

(10) Patent No.: US 7,382,497 B2
(45) Date of Patent: Jun. 3, 2008

(54) IMAGE PICKUP APPARATUS AND IMAGE PICKUP METHOD

(75) Inventor: Yusuke Shirakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 10/404,329

(22) Filed: Apr. 2, 2003

(65) Prior Publication Data

US 2003/0193695 A1    Oct. 16, 2003

(30) Foreign Application Priority Data

Apr. 10, 2002  (JP) .............................. 2002-108230
Apr. 10, 2002  (JP) .............................. 2002-108231

(51) Int. Cl.
*H04N 1/21*   (2006.01)
*H04N 1/40*   (2006.01)

(52) U.S. Cl. ...................... 358/302; 358/445; 358/451; 358/1.16; 348/335; 348/345

(58) Field of Classification Search ................ 358/302, 358/1.16, 445, 451; 348/345, 335, 207.1, 348/207.11, 208.1–208.16; 396/155
See application file for complete search history.

(56) References Cited

U.S. PATENT DOCUMENTS

| | | |
|---|---|---|
| 5,965,875 A | 10/1999 | Merrill |
| 6,934,050 B2 * | 8/2005 | Merrill et al. ............. 358/1.16 |
| 7,057,659 B1 * | 6/2006 | Mihara et al. ............. 348/345 |
| 7,064,784 B2 * | 6/2006 | Nakashita ................ 348/231.6 |
| 2002/0037167 A1 * | 3/2002 | Sakurada et al. ........... 396/155 |
| 2003/0043292 A1 * | 3/2003 | Pyle et al. .................. 348/364 |

FOREIGN PATENT DOCUMENTS

| | | |
|---|---|---|
| JP | 59-069051 | 4/1984 |
| JP | 5-199535 | 8/1993 |
| JP | 7-074340 | 3/1995 |
| JP | 2001-275122 | 10/2001 |

OTHER PUBLICATIONS

Jul. 24, 2007 Communication in Japanese Application No. 2002-108230.

* cited by examiner

*Primary Examiner*—King Y Poon
*Assistant Examiner*—Quang N Vo
(74) *Attorney, Agent, or Firm*—Fitzpatrick, Cella, Harper & Scinto

(57) ABSTRACT

An image pickup apparatus and an image pickup method perform different processing on signals from respective photoelectric conversion portions in accordance with changes of photographing conditions. The signals to be subjected to the different processing are output from an image pickup region provided with an arrangement of a plurality of arranged pixels each including a plurality of photoelectric conversion portions arranged in a depth direction severally.

6 Claims, 13 Drawing Sheets

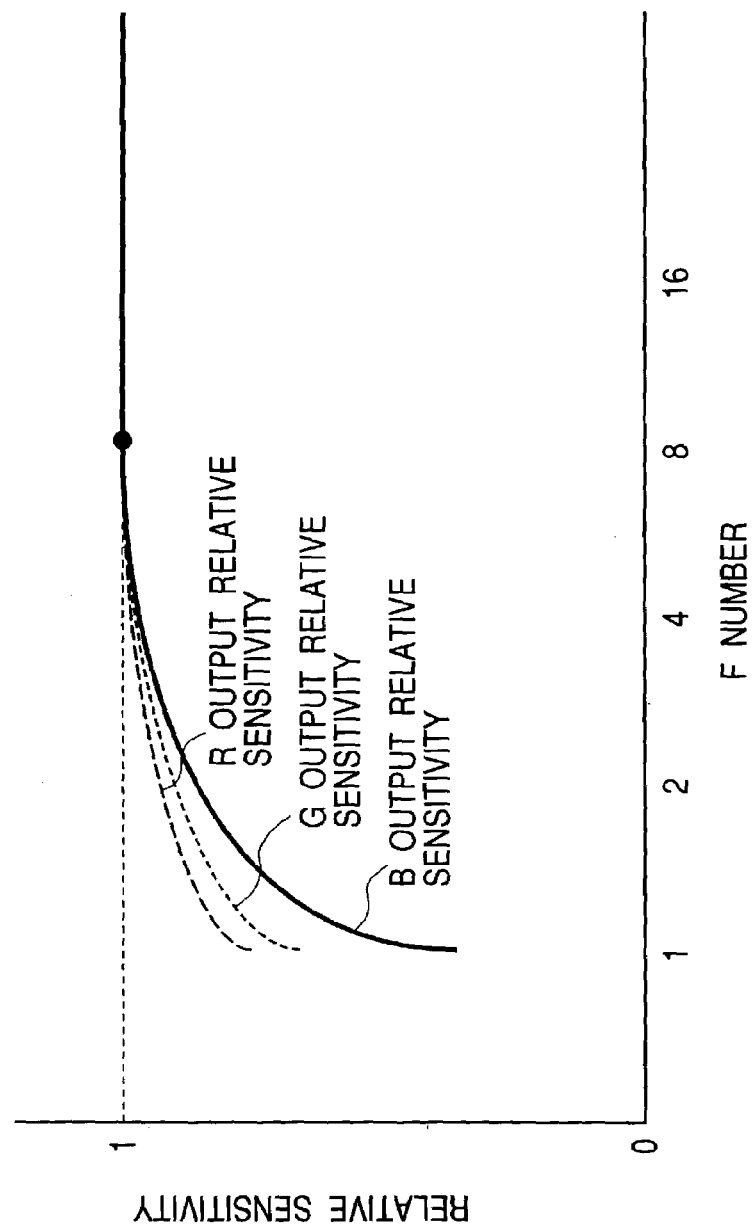

IMAGE PICKUP APPARATUS AND IMAGE PICKUP METHOD

BACKGROUND OF THE INVENTION

1. Field of the Invention

The present invention relates to an image pickup apparatus and an image pickup method, both using an image pickup region provided with an arrangement of a plurality of pixels each including a plurality of photoelectric conversion portions arranged in a depth direction.

2. Related Background Art

An image pickup apparatus such as a digital camera ordinarily has a configuration as shown in FIG. 12. In the configuration shown in this figure, a system control central processing unit (CPU) 1200 detects a change of the state of a camera operation switch (SW) 1201 (composed of a main SW and a release SW of the camera) caused by a photographer himself or herself, and starts to supply electric power to each circuit block other than the system control CPU 1200 itself.

An image of an object in a range of a photographing screen is formed onto an image pickup element 1204 through a main photographing optical system 1202 and 1203. An electric signal from the image pickup element 1204 based on the formed image is input into a correlated double sampling (CDS)/automatic gain control (AGC) circuit 1205. The CDS/AGC circuit 1205 removes reset noises included in the input electric signal in accordance with a method such as a known correlated double sampling, and performs the clamp processing of optical black (OB) pixels to reproduce a black level. After that, the electric signal is input into an analog to digital (A/D) conversion circuit 1206 to be converted into a predetermined digital signal at every pixel in order.

Here, the image pick up element 1204 generates an output of an image signal by being driven in a predetermined way using an output from a driver circuit 1207 for performing horizontal driving and vertical driving of each pixel on the basis of a signal from a timing generator 1208 which determines the driving timing of the whole.

The CDS/AGC circuit 1205, which converts an output of the image pickup element 1204 to a predetermined signal level by processing the output in an analog processing way, and the A/D conversion circuit 1206 similarly operate on the basis of the timing from the timing generator 1208.

An output from the A/D conversion circuit 1206 is input into a memory controller 1215 through a selector 1209, which selects signals on the basis of a signal from the system control CPU 1200. The memory controller 1215 transfers all of the output signals of the selector 1209 to a frame memory 1216. Consequently, all of the image data of every photographing frame is stored in the frame memory 1216 once. Hence, the image pickup apparatus performs writing operations of all of the photographed data into the frame memory 1216 in case of continuous photographing or the like.

After the completion of an photographing operation, the contents of the frame memory 1216 storing the photographed data are transferred to a camera digital signal processor (DSP) 1210 through the selector 1209 under the control of the memory controller 1215. The camera DSP 1210 generates respective color signals of red (R), green (G) and blue (B) on the basis of each pixel data of each photographed data stored in the frame memory 1216. In an operation state before photographing, the camera DSP 1210 ordinarily transfers the results of the generation of the color signals to a video memory 1211 periodically (at every frame) to display the results in the finder of the image pickup apparatus through a monitor display unit 1212.

On the other hand, when a photographer himself or herself performs a photographing operation by operating the camera operation SW 1201, each pixel data of one frame is read from the frame memory 1216, and subjected to image processing by the camera DSP 1210. And then, the processed pixel data is stored in a work memory 1213 once.

Successively, the data stored in the work memory 1213 is compressed on the basis of a predetermined compression format by a compression and expansion unit 1214, and the results of the data compression are stored in an external nonvolatile memory 1217 (ordinarily a nonvolatile memory such as a flash memory is used).

Moreover, when photographed image data is observed, the compressed data stored in the external nonvolatile memory 1217 is expanded to be ordinary data of each photographing pixel by the compression and expansion unit 1214, and the results of the expansion of the data are transferred to the video memory 1211. Thereby, the image data can be observed with the monitor display unit 1212.

As described above, an ordinary digital camera is configured to convert an output of the image pickup element 1204 into actual image data with process processing circuits almost in real time, and to output the result of the conversion of the output to the nonvolatile memory 1217 or the monitor display unit 1212.

In case that the image pickup element 1204 in the digital camera as described above is an multi-layer photodiode type color image sensor as shown in FIGS. 13A and 13B (see U.S. Pat. No. 5,965,875), the depths of photodiodes for detecting light, from the surface of the image pickup element are different from one another at respective three color outputs of R, G and B of the image pickup element.

The color image sensor of this type performs color separation by utilizing the differences of spectral sensitivity characteristics depending on the depths from the surface of the sensor. That is, a photodiode for outputting a B output, a photodiode for outputting a G output, and a photodiode for outputting an R output are laminated in the depth direction of the sensor to divide electric charges generated by incident light, in accordance with the entered depths. Then, the electric current of each photodiode is detected, and thereby the color image sensor obtains color outputs.

However, in the image pickup element of the configuration like this, there is a case where the output levels of the three photodiodes laminated in the depth direction are different from one another according to photographing conditions such as a change of the F number of a photographic lens.

That is, the F number proportionality of output levels of an image pickup element is closely related to the depths of photodiodes from the surface of the image pickup element. In case of a multi-layer photodiode type color image sensor, there is a case where the F number proportionality differs at every color output. In such a case, the output level ratios among respective colors differ between the case where an iris is diaphragmed and the case where the iris is opened. Consequently, a problem in which hues of an image differs in such cases is produced.

On the other hand, the spectral sensitivity characteristics of respective color outputs of an image pickup element in a digital camera configured as described above are dispersed a little owing to the differences of the manufacturing times of the image pickup elements and individual differences.

For obliterating the individual differences of the image pickup elements and for obtaining good color reproducibility, a color correction is mainly made by calibration in a camera manufacturing process in prior art. That is, adjustment values obtained by the execution of a set of a series of calibration are stored in a digital camera in advance, and corrections of images are performed by means of the stored adjustment values.

However, in the case where an image pickup element has a structure as shown in FIGS. 13A and 13B, respective color output levels of the image pickup element change owing to the dispersion of temperature characteristics of photodiodes themselves and the dispersion of the characteristics of output circuits when external factors such as temperature changes and aging are applied to the image pickup element. Then, even if the light having the same wavelength enters into the image pickup element under the same conditions, there is a case where the ratios among respective color output levels of R, G and B change. In such a case, a problem in which the hues of images output finally always change and stable image qualities cannot obtained is produced.

SUMMARY OF THE INVENTION

The present invention was made for settling the above-mentioned problems, and aims to provide an image pickup apparatus and an image pickup method, both capable of obtaining good image qualities stably even if image pickup conditions such as the state of an iris change.

An aspect of the present invention is configured as follows as means for achieving the object described above.

That is, an aspect of the present invention is an image pickup apparatus comprising:

an image pickup region provided with an arrangement of a plurality of pixels each including a plurality of photoelectric conversion portions arranged in a depth direction; and operation unit which executes different operation processing on respective signals from the plurality of photoelectric conversion portions arranged in the depth direction, in accordance with a change of an image pickup condition.

Another aspect of the present invention is an image pickup method using an image pickup region provided with an arrangement of a plurality of arranged pixels each including a plurality of photoelectric conversion portions arranged in a depth direction, the method comprising the steps of:

performing image pickup using the image pickup region; and executing different operation processing on respective signals from the plurality of photoelectric conversion portions arranged in the depth direction, in accordance with a change of an image pickup condition.

Another object of the present invention is to provide an image pickup apparatus and an image pickup method, both capable of obtaining good image qualities stably even if an output level of an image pickup element changes.

That is, further aspect of the present invention is an image pickup apparatus comprising:

an image pickup region provided with an arrangement of a plurality of arranged pixels each including a plurality of photoelectric conversion portions arranged in a depth direction;

control unit which controls a calibration mode for performing photographing to obtain correction data and a main photographing mode for performing main image photographing; and correction unit which corrects a signal level ratio of signals obtained in the main photographing mode from the plurality of photoelectric conversion portions arranged in the depth direction, on a basis of the correction data obtained in the calibration mode.

Still further aspect of the present invention is an image pickup method using an image pickup region provided with an arrangement of a plurality of arranged pixels each including a plurality of photoelectric conversion portions arranged in a depth direction, the method comprising the steps of:

performing calibration photographing using the image pickup region to obtain correction data;

photographing a main image by use of the image pickup region; and correcting a signal level ratio of signals obtained in the step of photographing the main image from the plurality of photoelectric conversion portions arranged in the depth direction, on a basis of the correction data obtained in the step of performing calibration photographing.

BRIEF DESCRIPTION OF THE DRAWINGS

The objects of the present invention will be clear in the following attached drawings and the detailed descriptions based on the drawings, in which:

FIG. 3 is an example of graphs indicating the F number proportionalities of the respective color outputs of R, G and B;

DESCRIPTION OF THE PREFERRED EMBODIMENTS

In the following, the preferred embodiments of the present invention will be described by reference to the attached drawings.

First Embodiment

Figure 1:
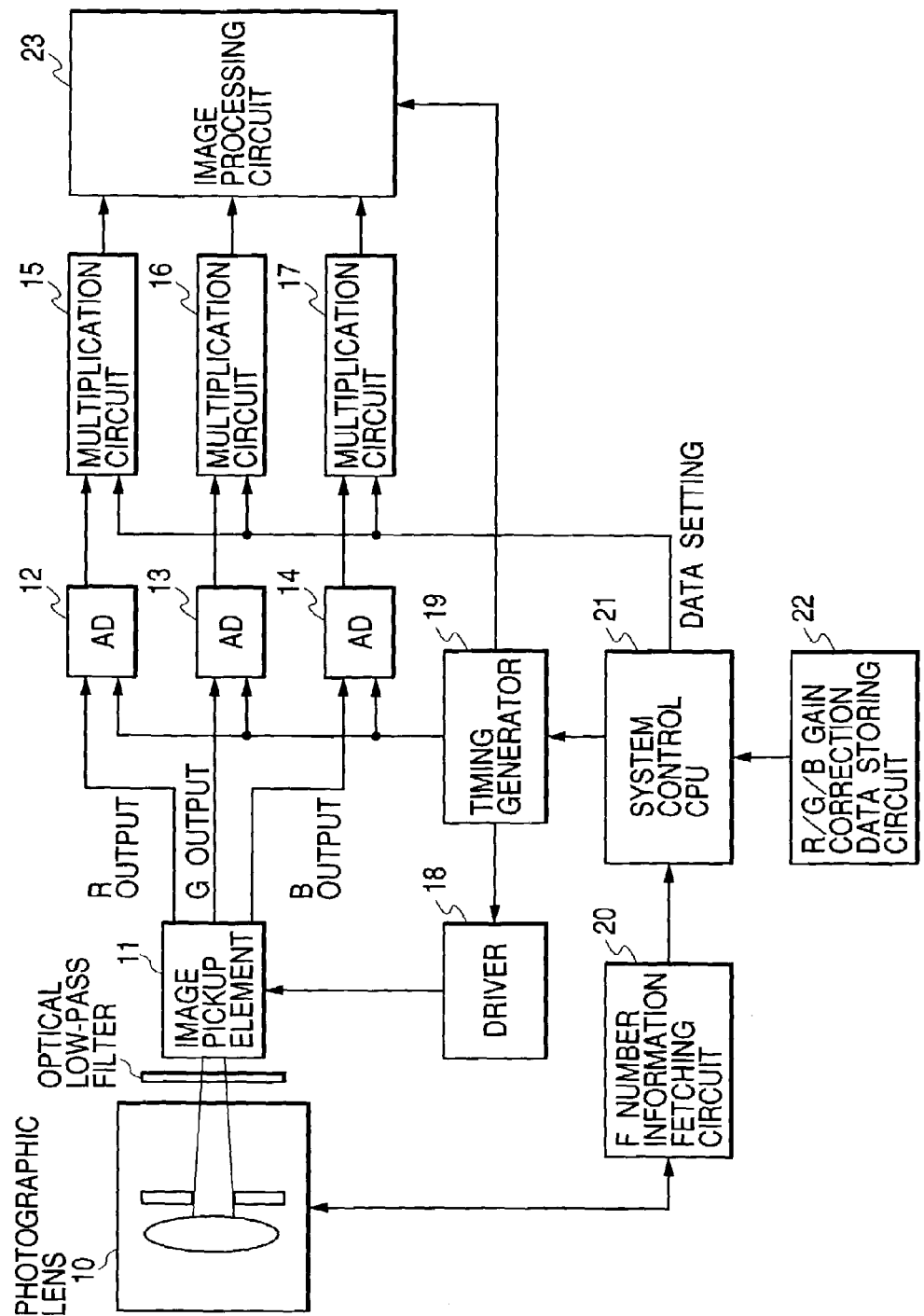
FIG. 1 is a block diagram showing the whole configuration of an image pickup apparatus according to a first embodiment of the present invention.

A block diagram showing the whole configuration of a digital camera (image pickup apparatus) according to the present embodiment is shown in FIG. 1. The image pickup apparatus of FIG. 1 includes circuit blocks for correcting F number proportionalities according to the present invention.

In FIG. 1, a reference numeral 10 denotes a photographic lens for forming an image of a subject onto an image pickup element 11. The photographic lens 10 includes an iris. The reference numeral 11 denotes the image pickup element an pixel of which includes a plurality of photoelectric conversion portions arranged in its depth direction. The details of the image pickup element 11 will be described later. Reference numerals 12 to 14 denote A/D conversion circuits. Signals from three photodiodes arranged in the depth direction are output from the image pickup element 11 in parallel to one another, and are input into the A/D conversion circuits 12 to 14 in parallel to one another. Reference numerals 15 to 17 denote multiplication circuits for multiplying outputs from the A/D conversion circuits 12 to 14 by the predetermined gain correction values. A reference numeral 18 denotes a driver for driving the image pickup element 11. A reference numeral 19 denotes a timing generator for transmitting timing signals to the driver 18, the A/D conversion circuits 12 to 14 and the like. A reference numeral 20 denotes an F number information fetching circuit for fetching F number information from the photographic lens 10. A reference numeral 21 denotes a system control CPU for controlling the whole. A reference numeral 22 denotes an R/G/B gain correction data storing circuit for storing gain correction values of respective color signals of R, G and B corresponding to changes of the F number. A reference numeral 23 denotes an image processing circuit for performing processing such as a matrix operation and the like on signals from the multiplication circuits 15 to 17.

Figure 2A:
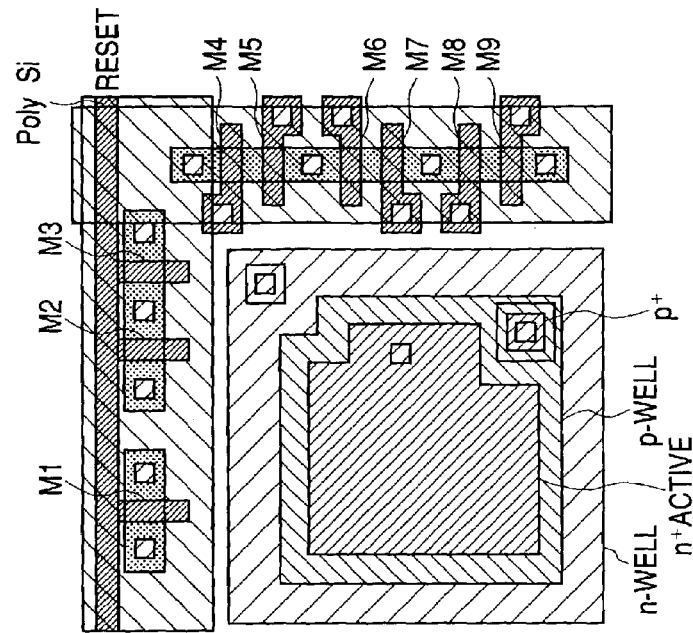
FIGS. 2A and 2B are views for illustrating a principle that the F number proportionalities of respective color outputs differ from one another.
Figure 2B:
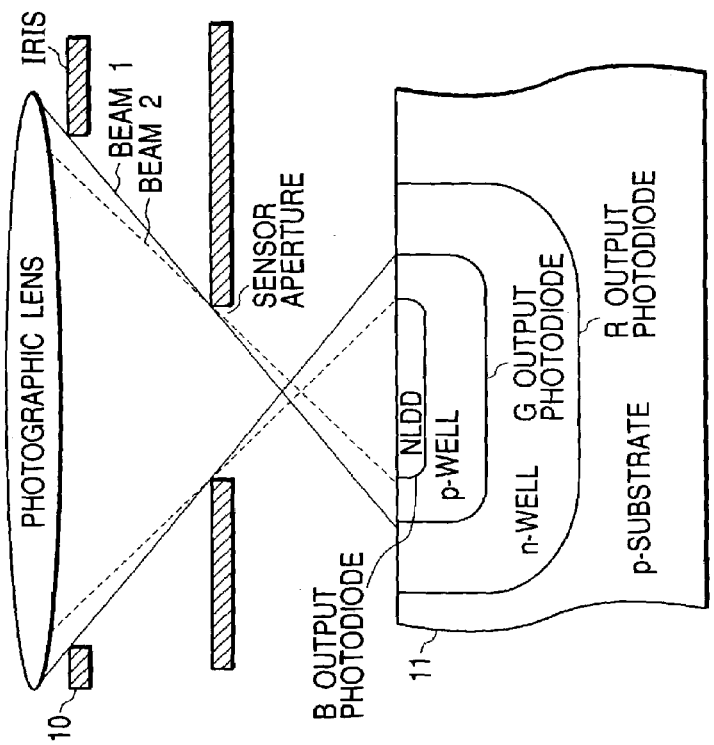

FIGS. 2A and 2B are views for illustrating a principle that the F number proportionalities of respective color outputs differ from one another.

The image pickup element 11 used in the present embodiment includes a plurality of photodiodes serving as photoelectric conversion portions, arranged in its depth direction as shown in FIG. 2A.

As shown in FIG. 2A, the image pickup element 11 includes a B output photodiode near to the surface of the sensor. The image pickup element 11 further includes a G output photodiode under the B output photodiode, and an R output photodiode under the G output photodiode. The three photodiodes are not only superposed in the depth direction of the sensor, but also satisfy the following relationship in their areas. That is, as shown in FIG. 2B, the area of the G output photodiode is wider than that of the B output photodiode, and the area of the R output photodiode is wider than that of the G output photodiode. Aluminum wiring and the like are formed on the three photodiodes, and further a sensor aperture which shields the output circuit portion from light is formed over the aluminum wiring. Incident light having large incident angles are intercepted by the sensor aperture. If the F number of a photographic lens is large, the incident light from the photographic lens includes only the components having small incident angles (near to perpendicular to the aperture plane of the photodiodes). However, when the F number of a photographic lens is small, the incident light from the photographic lens includes the components having large incident angles. The components having the large incident angles are intercepted by the aperture of the photodiodes, and consequently the relative sensitivity of the image pickup element becomes small.

FIG. 3 is an example of graphs indicating the F number proportionalities of the respective color outputs of R, G and B of a multi-layer photodiodes type color image sensor such as the image pickup element 11 shown in FIG. 2A. In FIG. 3, the relative sensitivities are defined to be one in case that the F number is eight, and indicate relative quantities of the sensitivity of the image pickup element 11 when the F number is changed while the exposure is kept to be constant. If the relative sensitivity does not change even when the F number changes, the graphs become a single straight line extending horizontally. This indicates that the F number proportionality is kept.

In FIG. 3, as to F numbers larger than eight (F8), the F number proportionality is almost kept. In this case, when F number is changed, the relative sensitivity of each color changes little. As the F number becomes smaller than eight, the relative sensitivity gradually falls. In case of the multi-layer photodiode sensor as shown in FIGS. 2A and 2B, the B output photodiode is arranged at a position nearest to the surface of the sensor, but the photodiode area thereof is the smallest. Consequently, the incident light having a large incident angle is easily influenced by interception at the sensor aperture. That is, the F number proportionality of the B output signal from the B output photodiode having the smallest area is worst. The F number proportionality of the R output signal from the R output photodiode having the largest area is best. Consequently, the results of FIG. 3 are obtained.

Furthermore, in case of the color image sensor having the multi-layer photodiode structure as shown in FIGS. 2A and 2B, the shapes of the curves of the F number proportionality are not determined only by the areas of the respective color photodiodes, but are also related to the depths of respective color photodiodes.

Figure 4:
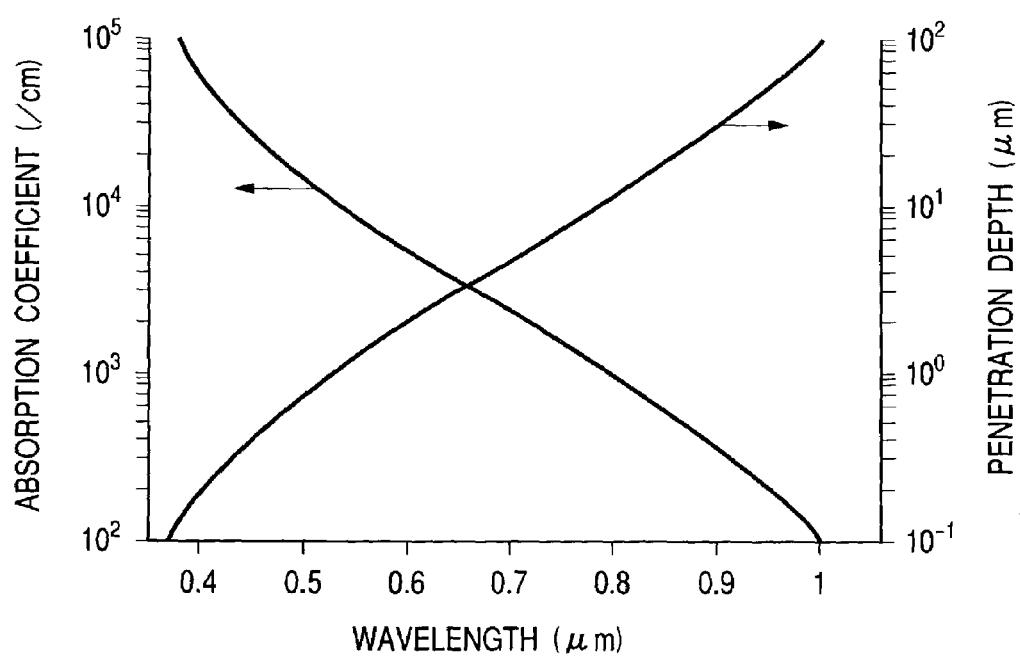
FIG. 4 is a graph illustrating absorption coefficients of light entering into an image pickup element and positions in the depth direction at which photoelectric conversions of the light are performed in connection with the wavelengths of the light.

FIG. 4 is a diagram showing the principle that a multi-layer photodiode type color image sensor detects light having different wavelengths by utilizing the fact that the light entered into the sensor are photoelectrically converted at different positions in the depth direction of the sensor in accordance with the wavelengths of the light. Respective color components of R, G and B are separated by utilizing differences of penetration depths and absorption coefficients depending on the wavelengths of the light. The penetration depths are the depths from the surface of the sensor to which light can enter into the sensor. The multi-layer photodiode type color image sensor utilizes the principle described above. Consequently, when a light has a large incident angle, traveling distances of the light to the G output photodiode and the R output photodiode are long. Then, the spectral sensitivity of the sensor to the light differs from that to a light entering into the sensor perpendicularly. That is, even if the same color light enters, components having large incident angles are included in the light in case of using a lens having a large F number in comparison with the case of using a lens having a small F number. As a result, the ratios of the sensitivity of respective color output photodiodes differ from one another. Consequently, the F number proportionalities of respective color outputs differ from one another.

As described above, in the multi-layer photodiode type color image sensor, the F number proportionalities of respective color outputs differ from one another. Consequently, the hues of images in case of a large F number differ from those in case of a small F number.

According to the present embodiment, the correction of the F number proportionality is performed on every color output of the image pickup element 11. Consequently, the differences of hues owing to the differences of the F numbers are settled.

Figure 5:
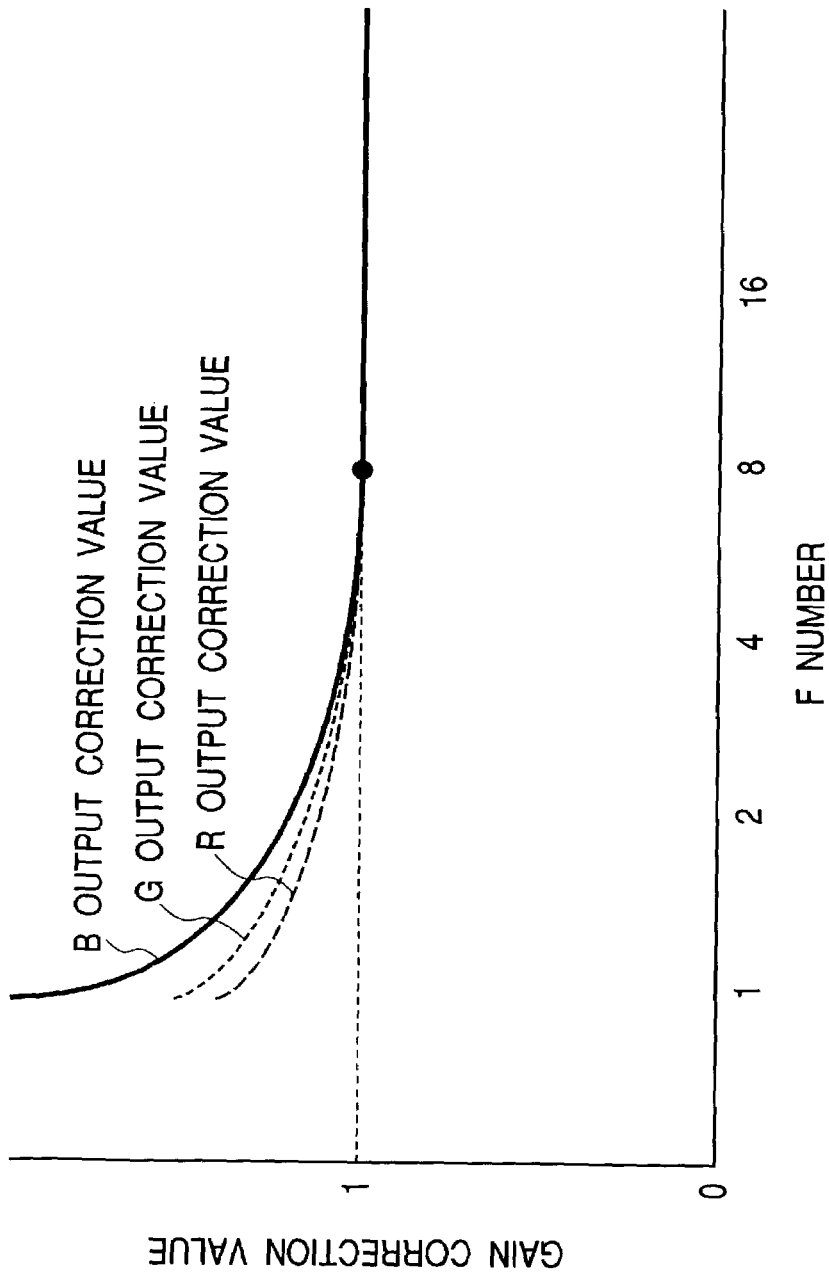
FIG. 5 is a graph illustrating gain correction values for correcting F number proportionalities.

FIG. 5 shows gain correction values for correcting F number proportionalities. The multiplication circuits 15 to 17 shown in FIG. 1 are correction circuits for performing actual corrections based on the correction values. The correction values are inverse numbers of the relative sensitivity of the F number proportionalities shown in FIG. 3. The correction values of respective colors of R, G and B are determined in accordance with the F number of the photographic lens 10 at the time of photographing.

Figure 6:
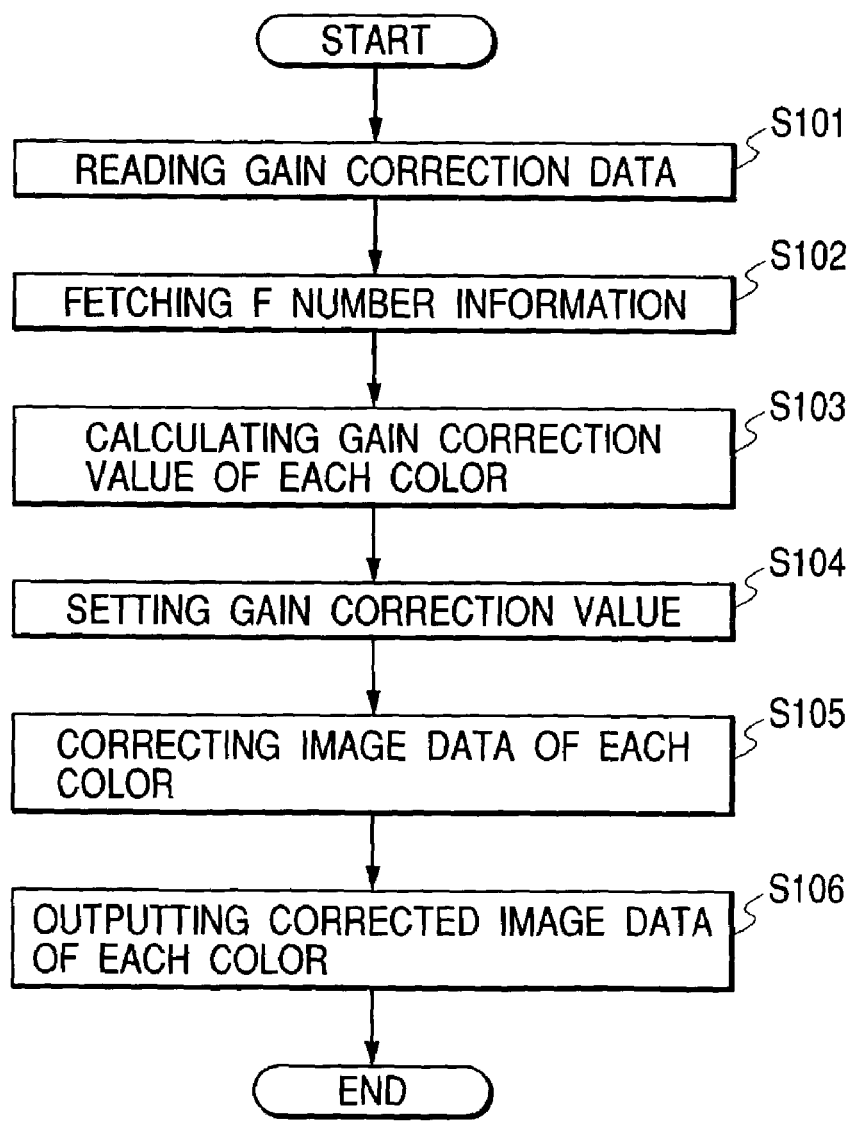
FIG. 6 is a flow chart for illustrating a procedure of correction processing in the first embodiment.

Next, a procedure of the system control CPU 21 for performing correction processing according to the present invention by controlling the image pickup apparatus of FIG. 1 will be described by means of the flow chart of FIG. 6.

The system control CPU 21 reads gain correction data of the F number proportionalities of respective colors of R, G and B from the R/G/B gain correction data storing circuit 22 in advance (Step S101). At the time of photographing, the system control CPU 21 fetches F number information from the photographic lens 10, exposure information and the like (Step S102), and calculates the gain correction values of respective colors of R, G and B corresponding to the F number from the gain correction data read out from the storing circuit (Step S103). Then, the system control CPU 21 sets the calculated gain correction values into the multiplication circuits 15 to 17 (Step S104). The multiplication circuits 15 to 17 multiply image data by the set gain correction values, and thereby perform the gain correction of each color image data (Step S105). The multiplication circuits 15 to 17 output the corrected image data of respective colors to the image processing circuit 23 (Step S106).

The configuration described above is one for storing the gain correction values of respective colors of R, G and B corresponding to the changes of the F number, in advance. However, the configuration may be one for obtaining the gain correction values by performing operations at every photographing.

Moreover, the present embodiment is configured to output the signals of the plurality of photoelectric conversion portions arranged in the depth direction, from the image pickup element 11 in parallel to one another. However, the following configurations may be adopted. That is, a configuration in which the signals from the plurality of photoelectric conversion portions are output from an image pickup element sequentially and the sequentially-output signals are subjected to operated by a multiplication circuit may be adopted. In another case, a configuration in which the signals from the plurality of photoelectric conversion portions are output from the image pickup element 11 in parallel with one another and are sequentially output from a multiplexer (MPX) at the preceding stage of an A/D conversion circuit may be adopted.

Figure 7:
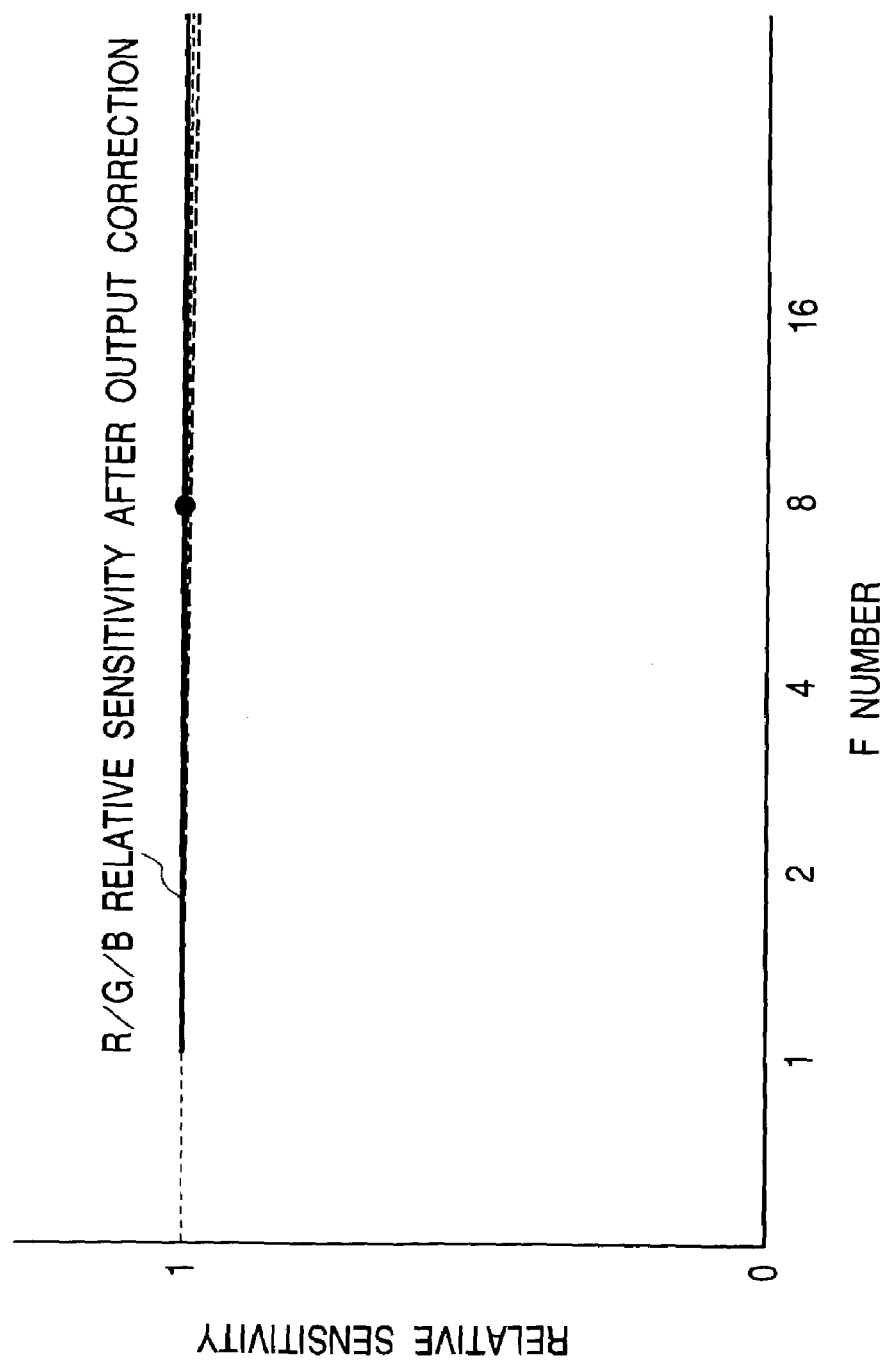
FIG. 7 is a graph illustrating F number proportionalities after corrections.

As described above, the image pickup apparatus includes the image pickup element 11 provided with an arrangement of a plurality of pixels having photoelectric conversion portions arranged in the depth direction, and operation means which includes the multiplication circuits 15 to 17 for performing different operation processing on respective signals from the plurality of photoelectric conversion portions arranged in the depth direction, in accordance with the changes of the F number of the photographic lens 10 (changes of the incident angles of light), the F number information fetching circuit 20, the system control CPU 21 and the R/G/B gain correction data storing circuit 22. The F number proportionalities of an image corrected by the image pickup apparatus is like the graphs shown in FIG. 7. As shown in FIG. 7, the relative sensitivity becomes almost constant independently of F numbers, and the differences between respective color outputs are removed. That is, even if the F number is changed, the hue and the sensitivity of the image do not change, and a good image quality can stably be obtained.

In the above, descriptions are given to the configuration to set gain correction values according to changes of the F number of the photographic lens 10. However, the present invention can adopt other configurations such as the one in which different gain correction values are set to respective signals from the plurality of photoelectric conversion portions arranged in the depth direction, in accordance with photographing conditions such as the brightness of a subject.

As described above, the image pickup apparatus of the present embodiment includes the image pickup region provided with the arrangement of the plurality of arranged pixels each including the plurality of photoelectric conversion portions arranged in its depth direction, and the operation means for performing different operation processing on respective signals from the plurality of photoelectric conversion portions arranged in the depth direction, in accordance with changes of photographing conditions such as the F number, the brightness of a subject and the like. Consequently, good image qualities can stably be obtained.

Second Embodiment

In the present embodiment, descriptions will be given to a case where signal level ratios of respective color image pickup signals obtained from an image pickup element are corrected according to external factors such as temperature changes and aging.

Figure 12:
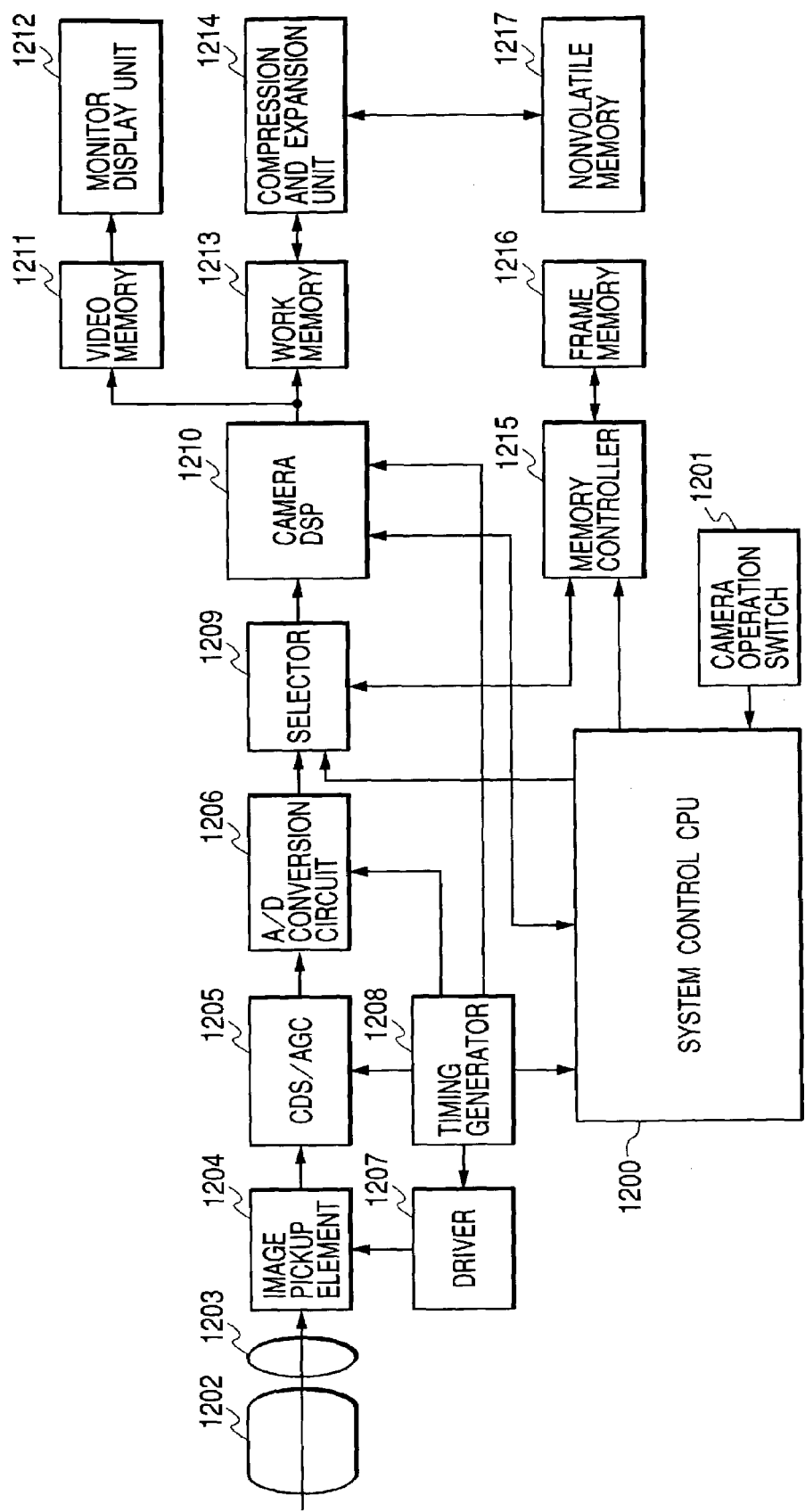
FIG. 12 is a block diagram for illustrating the whole configuration of an ordinary digital camera (image pickup apparatus)

The whole configuration of a digital camera (image pickup apparatus) according to the present embodiment is the same as that shown in FIG. 12. Then, the description of the whole configuration is omitted here. However, the image pickup apparatus of the present embodiment differs from the first embodiment in that illumination means such as a light emitting diode (LED) for illuminating the image pickup element 1204 is provided at the stage subsequent to the shutter capable of opening and closing to shield the light from entering onto the image pickup element 1204 in FIG. 12.

Figure 13A:
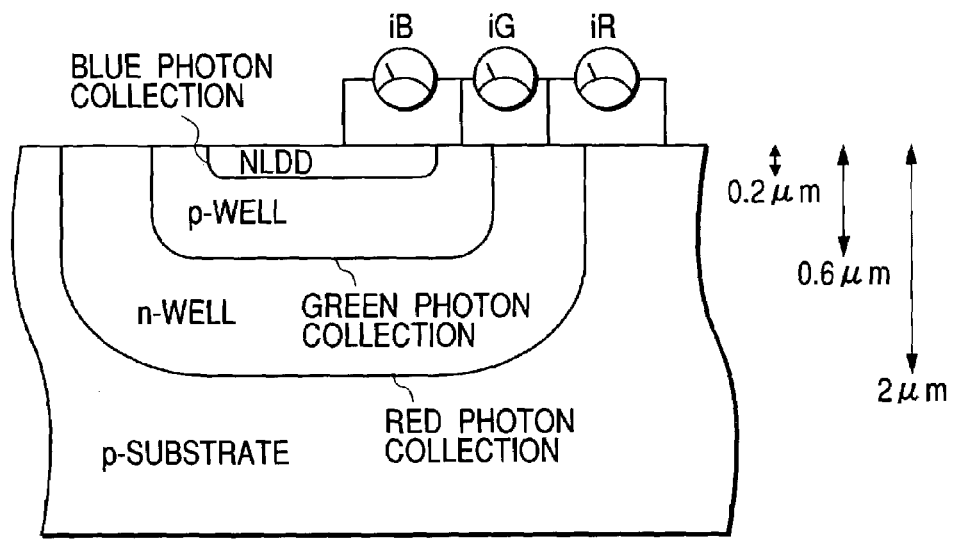
FIGS. 13A and 13B are diagrams for illustrating a multi-layer photodiode type color image sensor.
Figure 13B:
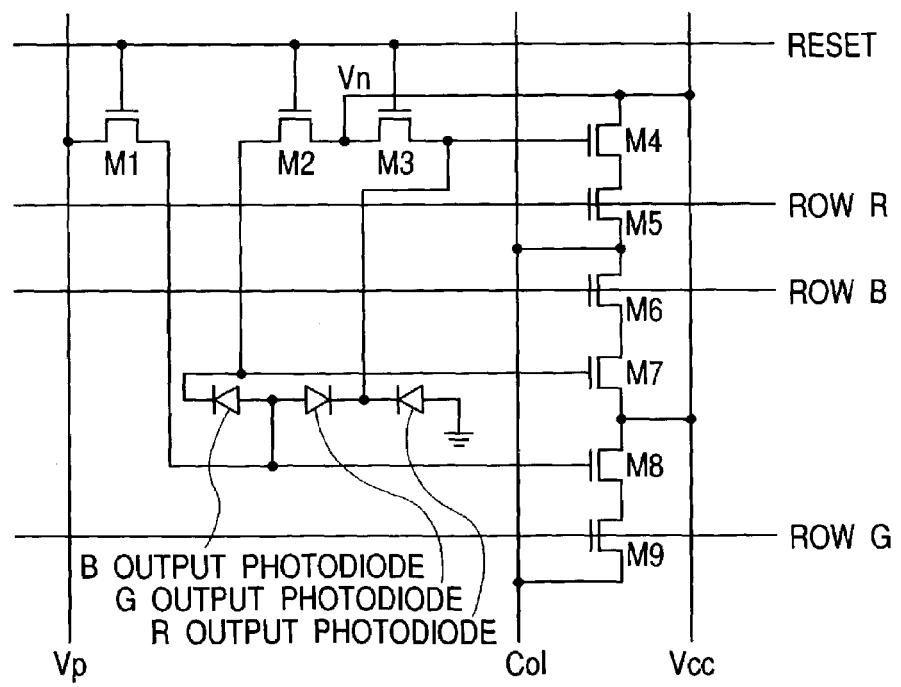

As shown in FIGS. 13A and 13B, the multi-layer photodiode type color image sensor disclosed in U.S. Pat. No. 5,965,875 divides signal charges generated from incident light in accordance with the depths from the surface of the sensor to read out the charges separately. Thereby, the multi-layer photodiode type color image sensor obtains three color signal outputs of R, G and B.

Figure 8:
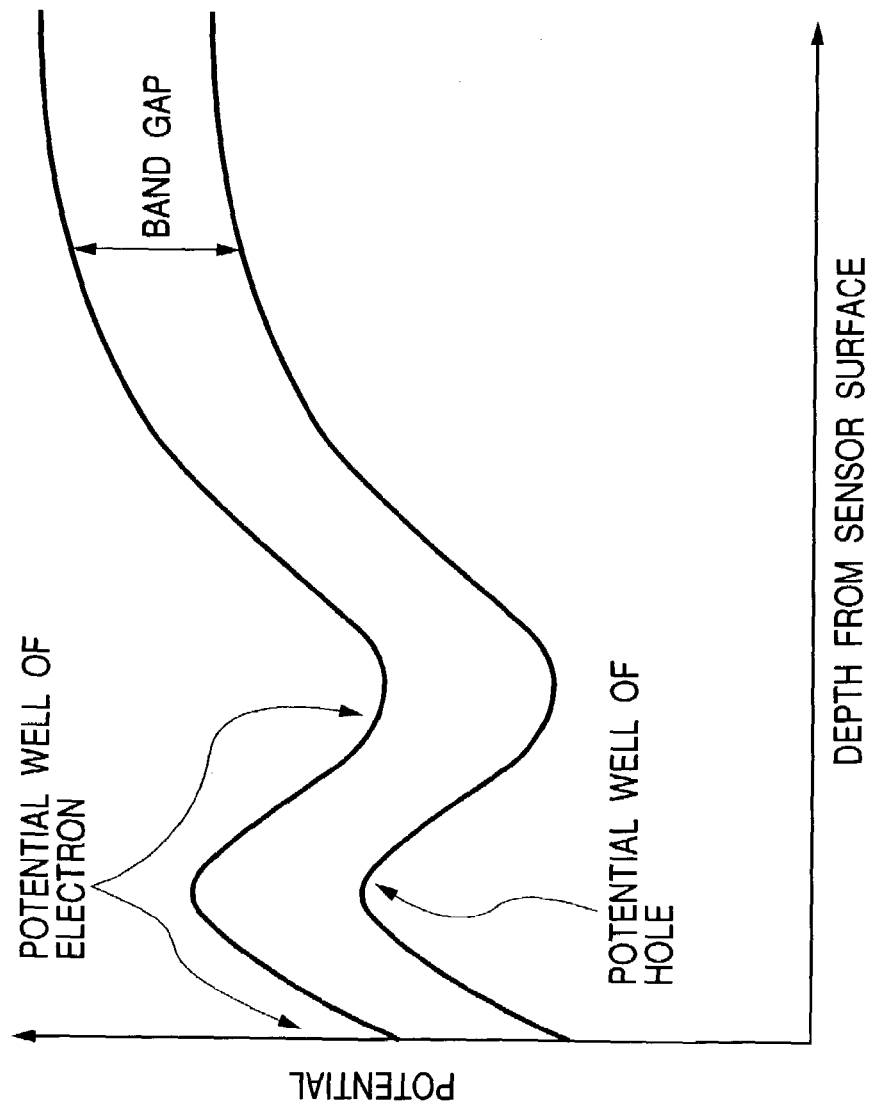
FIG. 8 is a type view of a band diagram of a multi-layer photodiode type color image sensor.

A one-dimensional band diagram in the depth direction of the multi-layer photodiode structure of this kind takes a form as shown in FIG. 8. In the form, there are formed potential wells in which electrons are stored and a potential well in which holes are stored, in accordance with the waviness of potential in the depth direction. There is the possibility that the waviness of the potential itself changes when temperature changes. Consequently, there is the possibility that the amount of charges stored in each potential well may change. When the ratio of the amounts of charges stored in respective potential wells changes, the ratio of signal levels of respective color outputs changes dependently on temperature changes even if the light under the same conditions enters. Consequently, there is the possibility that the hues of photographed images change even if photographing is performed to the same object by means of the same light source.

Furthermore, the image sensor disclosed in U.S. Pat. No. 5,965,875 outputs respective color outputs of R, G and B from the terminals separate from one another at the output stage of the signals of the sensor, and inner output amplifiers differ from one another with respect to respective color outputs. There is the possibility that the gains of the inner output amplifiers also change owing to temperature changes. Consequently, if no correction is performed on the changes of the gains, the following situation happens. That is, the hues of images change dependently to temperature changes owing to the changes of the gains even if the same object is photographed.

Ordinarily, the hues of outputs of a sensor are corrected by the performance of a white balance (WB) adjustment in the image processing procedure of the outputs. However, if there are the changes described above, the WB adjustment by a fixed gain method such as a preset WB adjustment method cannot correct the changes of hues owing to temperature changes.

Moreover, since the multi-layer photodiode structure utilizes potential curves of a semiconductor, the amounts of charges to be stored in respective potential wells become unbalanced when a light such as a primary color light which results in unbalanced outputs of respective colors enters. Thereby, the potential curves would change to produce the changes of sensitivity balances of respective color outputs.

According to the present embodiment, a calibration operation for obtaining correction data is performed at the timing near to the photographing of a main image before the photographing of the main image, and the ratio of respective color outputs of the sensor at the time of the calibration photographing is calculated. Thereby, the changes of hues of images at the time of the photographing of the main images are estimated, and the gains of respective color outputs from the image pickup element are corrected. Consequently, images having stable hues can be obtained even if temperature changes and the like happen.

Figure 9:
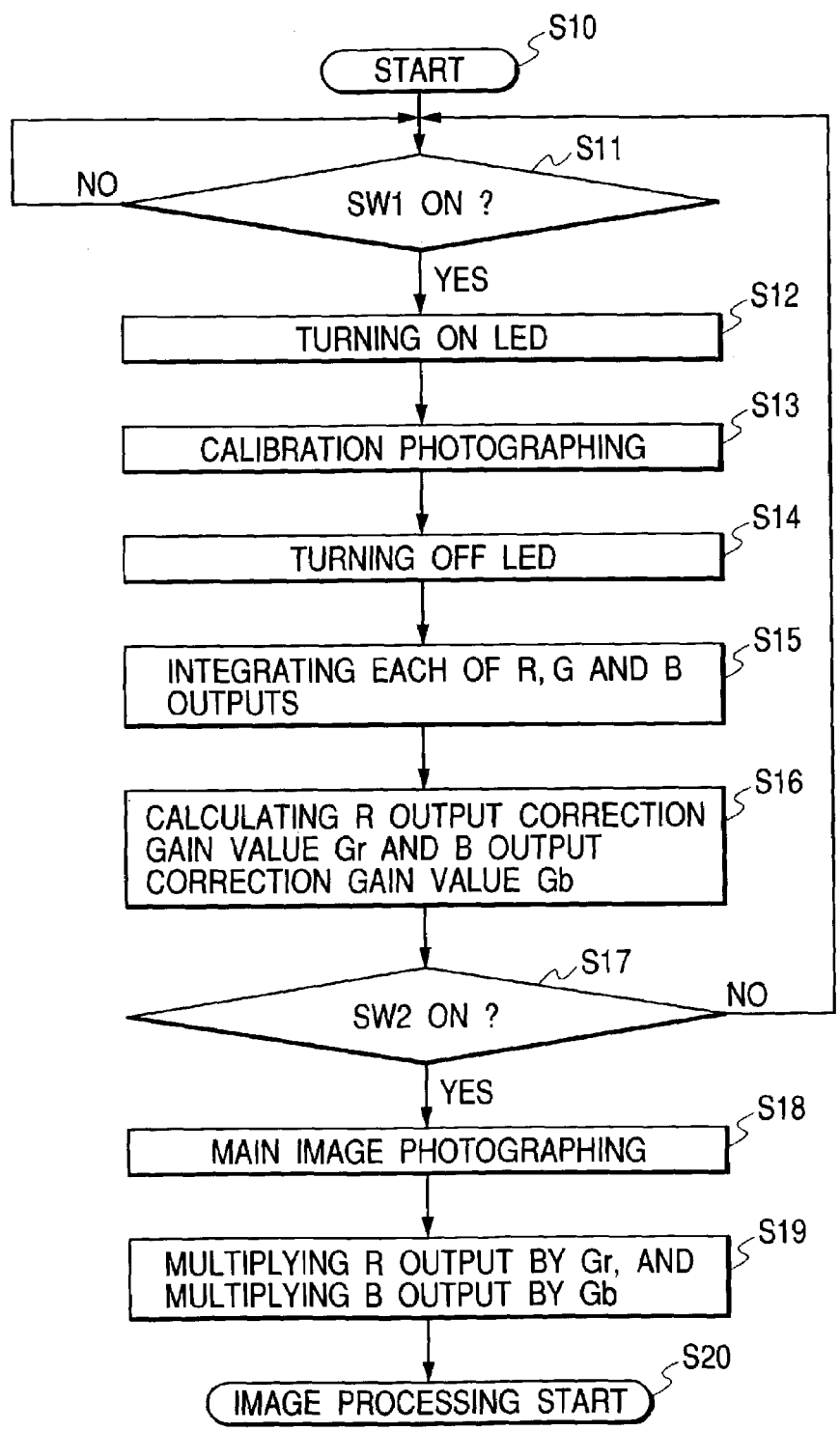
FIG. 9 is a flow chart of a calibration operation sequence in a second embodiment.

FIG. 9 shows a flow chart of an example of the sequence of a calibration operation and a main photographing operation among the operations of the system control CPU 1200 of the present embodiment.

A photometric operation and a range operation are performed with a release of photographing operations being half depressed (the state of a SW 1 being turned on; and Yes at Step S11). At the same time, the calibration operation of the image pickup element 1204 is performed (Steps S12 to S16).

A main photographing operation is performed (Steps S18 to S20) with the release being fully depressed to turn on a SW 2 (Yes at Step S17). Since it is not known how long the interval is from the turning on of the SW 1 to the turning on of the SW 2, the calibration operation is always periodically performed during a period in which the SW 1 remained being depressed for performing the calibration operation at the timing near to that of the main photographing operation. If the calibration photographing is performed, for example, every second, the interval of the main photographing operation from the latest calibration operation is one second at its maximum, which is sufficiently short. Consequently, changes of environment such as temperature changes during the interval can almost be neglected.

Figure 10:
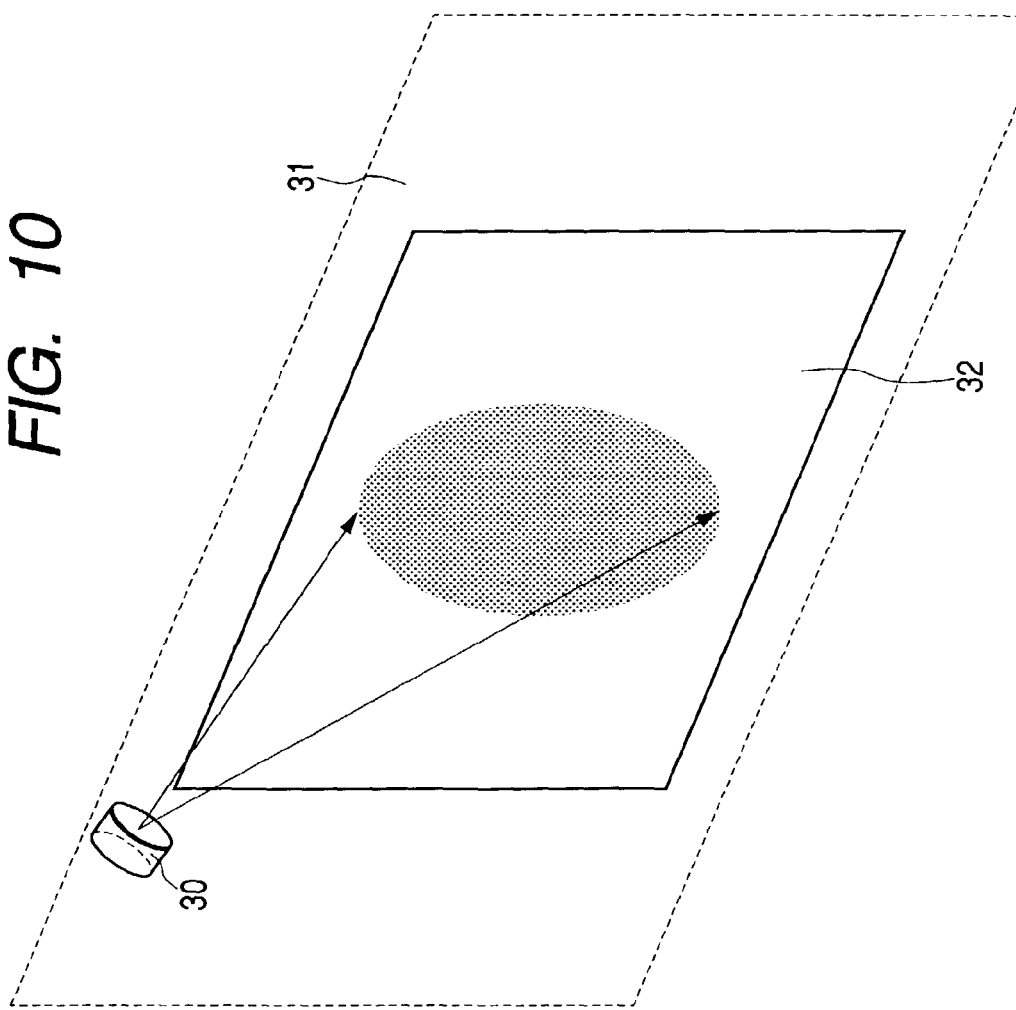
FIG. 10 is a view showing an illumination method of an image pickup apparatus.

The calibration operation is performed as follows. That is, as shown in FIG. 10, illumination means 30 such as an LED for illuminating the photosensitive surface of the image pickup element 32 is arranged in the digital camera. Then, the image pickup element 32 is illuminated by only the light from the illumination means 30 with a shutter 31 being closed (Step S12). The calibration photographing is performed in this state (Step S13). It is desirable for the illumination means 30 to be as small as possible in the change of the wavelength of emitting light and the change of the amount of the emitting light, caused by operation environment. Moreover, it is desirable to use a light source which emits white light as the illumination means to keep the ratios of respective outputs of R, G and B to be constant. However, the present invention also can adopt a method using a plurality of light sources which emit primary colors of R, G and B to perform calibration photographing a plurality of times, thereby calculating accurately the changes of hues caused by unbalance of respective color output levels.

Next, the LED is turned off (Step S14). Image data obtained by the calibration photographing is integrated at every color output to obtain a ratio of respective color outputs (Step S15). The correction is made to keep the ratio constant without changing at every photographing. For example, in the case where a G output is set to be a reference, gains Gr and Gb are calculated in accordance with the following formulae:

$Gr = \Sigma G / \Sigma R$ for R outputs; and $Gb = \Sigma G / \Sigma B$ for B outputs.

The R outputs and the B outputs are multiplied by the gains Gr and Gb at the camera DSP 1210 serving as the correction means (Step S16). In this case, the G output is supposed to have a gain of 0 dB. The ratio of the respective color outputs of the image pickup element calibrated in this way becomes constant under the same photographing conditions independently of temperature changes, and stable hues can be obtained.

Figure 11:
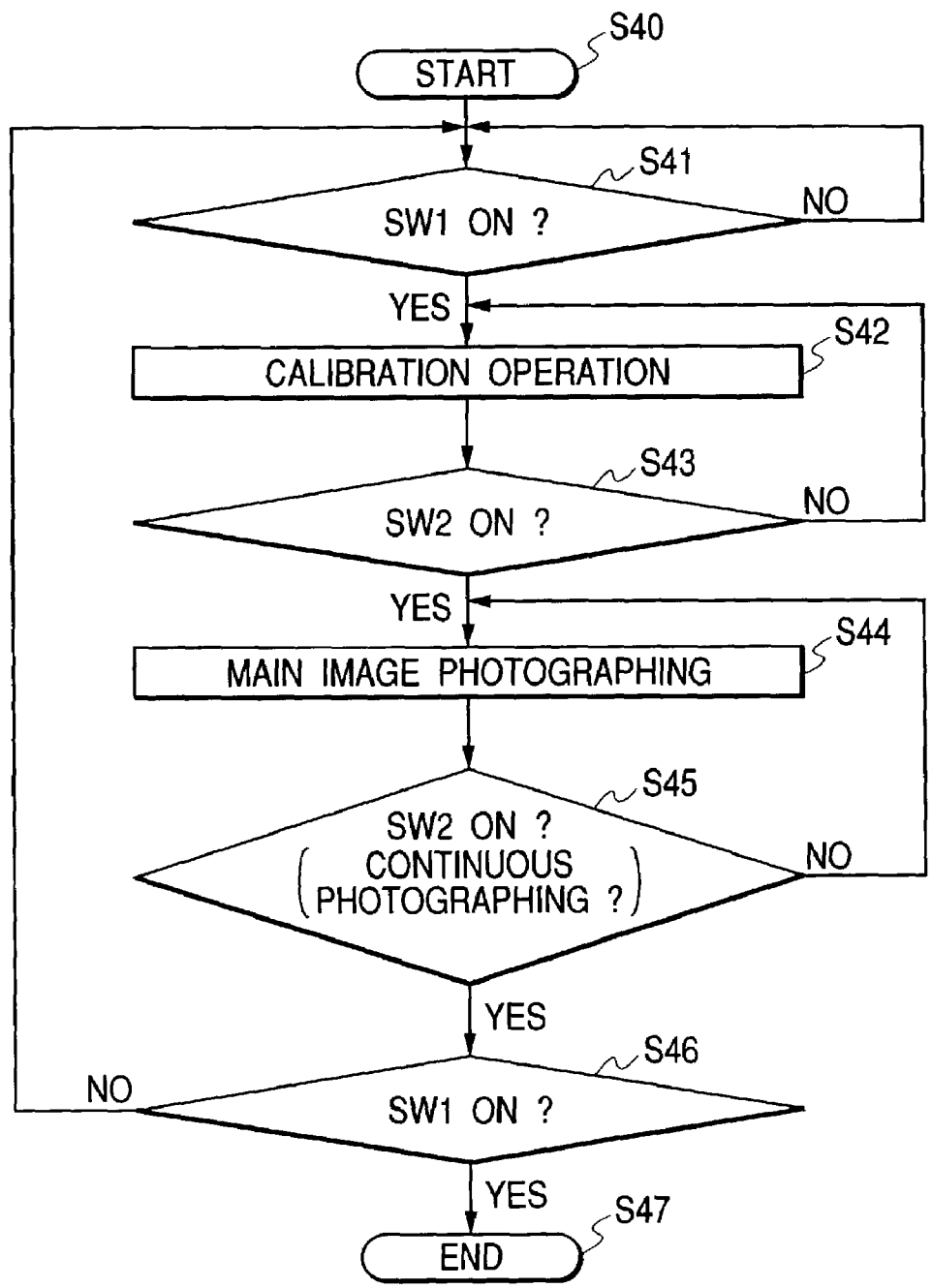
FIG. 11 is a flow chart showing a calibration operation sequence at the time of continuous photographing in the second embodiment.

FIG. 11 is an example of a flowchart showing a photographing sequence at the time of continuous photographing. In the calibration operation, the image pickup apparatus should be operated with being illuminated by the illumination means 30 to perform photographing. Consequently, the calibration operation requires a time for that. If the calibration operation is performed to each frame of main photographing in continuous photographing, the number of photographing frames per a unit time becomes about a half of that in case of performing no calibration operation. Accordingly, it becomes necessary to perform the calibration operation (Step S42) only once before continuous photographing on the assumption that the time period of a series of the continuous photographing is sufficiently short. Thereby, stable hues can be obtained without sacrificing the frame speed of the continuous photographing.

The embodiment described above performs the calibration operation before performing the main photographing. However, the calibration operation may be performed after the main photographing.

Moreover, as to the calibration operation, the above-mentioned configuration in which illumination means 30 is provided in the digital camera is preferable for making the ratio of respective color outputs constant and obtaining stable hues. However, other configurations may be adopted. For example, a configuration in which no illumination means is used and an image colored in white in the whole is photographed by a user with the shutter being opened may be adopted.

As described above, the present embodiment includes the image pickup element provided with the arrangement of the plurality of pixels each including the plurality of photoelectric conversion portions arranged in the depth direction, the system control CPU for controlling a calibration mode for performing photographing for obtaining correction data and a main photographing mode for performing main photographing, and the camera DSP for correcting the signal level ratio of signals obtained in the main photographing mode from the plurality of photoelectric conversion portions arranged in the depth direction, on the basis of the correction data obtained in the calibration mode. Consequently, it becomes possible to make the ratio of respective color outputs constant and to obtain stable hues.

As described above, according to the present invention, the image pickup apparatus for outputting color images can automatically hold color reproducibility to obtain good image qualities stably by performing a calibration operation at the timing near to that of performing main photographing, even if each color output level of an image pickup element changes owing to external factors such as temperature changes and aging.

OTHER EMBODIMENTS

In the embodiments described above, descriptions are given to the cases where the present invention is applied to a digital camera. However, the application of the present invention is not limited to such a case. The present invention can be applied to the other equipment such as a digital video camera as long as the equipment can use the image pickup elements used in the aforesaid embodiments.

Moreover, it is needless to say that the objects of the present invention can be achieved by providing a storage medium storing the program codes of software realizing the functions of the embodiments mentioned above to a system or an apparatus to make a computer (or a CPU or a micro processing unit (MPU)) of the system or the apparatus read the program codes stored in the storage medium to execute them.

In this case, the program codes, read out of the storage medium, themselves realize the functions of the embodiments described above. Consequently, the storage medium storing the program codes constitutes the present invention.

As the storage medium for supplying the program codes, for example, a flexible disk, a hard disk, an optical disk, a magneto-optical disk, a compact disk read-only memory (CD-ROM), a compact disc recordable (CD-R), a magnetic tape, a nonvolatile memory card, a read only memory (ROM) and the like can be used.

Moreover, it is needless to say that the present invention includes not only a case where the functions of the above-mentioned embodiments can be realized by executing the read program codes by means of the computer, but also includes a case where an operating system (OS) operating on the computer or the like performs a part or the whole of actual processing on the basis of the instructions of the program codes, and the functions of the above-mentioned embodiments can be realized by the actual processing.

Moreover, it is needless to say that the present invention includes a case where, after the program codes read from the storage medium have been written into a memory equipped in an expanded capability board inserted into a computer or an expanded capability unit connected to the computer, a CPU or the like installed in the expanded capability board or the expanded capability unit executes a part or the whole of the actual processing on the basis of the instructions of the program codes to realize the functions of the afore-mentioned embodiments by the actual processing.

In the above, the present invention has been described by means of the preferred embodiments. However, the present invention is not limited to the above-mentioned embodiments. Various variations of the embodiments can be done within the scope of the following claims.

What is claimed is:

1. An image pickup apparatus comprising:
   an image pickup device which comprises a first layer including a photoelectric conversion unit that generates a first color signal and a second layer including a photoelectric conversion unit that generates a second color signal different in color from the first color signal, the first and second layers being arranged respectively at different depths from the surface of said image pickup device;
   an illumination unit which illuminates said image pickup device;
   a control unit which controls a calibration mode to cause said illumination unit to illuminate said image pickup device and obtain correction data from an output level ratio between the first and second color signals generated respectively in the first and second layers of said image pickup device illuminated by said illumination unit; and
   a correction unit which corrects the output level ratio between the first and second color signals generated respectively in the first and second layers of said image pickup device in a main photographing mode, by using the correction data obtained by said control unit in said calibration mode,
   wherein said control unit periodically generates the correction data in said calibration mode before said control unit performs the main photographing.

2. An image pickup apparatus according to claim 1, said apparatus further comprising:
   a shutter capable of opening and closing for shielding light from entering onto said image pickup device,
   wherein said control unit obtains the correction data by making said illumination unit illuminate said image pickup device with said shutter closing in said calibration mode.

3. An image pickup apparatus according to claim 1, wherein said control unit has a continuous photographing mode, and does not execute control of said calibration mode during said continuous photographing mode.

4. An image pickup method using an image pickup device which comprises a first layer including a photoelectric conversion unit that generates a first color signal and a second layer including a photoelectric conversion unit that generates a second color signal different in color from the first color signal, the first and second layers being arranged respectively at different depths from the surface of the image pickup device, and an illumination unit which illuminates the image pickup device, said method comprising the steps of:
   operating the image pickup device in a calibration mode to cause the illumination unit to illuminate the image pickup device and obtain correction data from an output level ratio between the first and second color signals generated respectively in the first and second layers of the image pickup device illuminated by the illumination unit;
   photographing a main image by use of the image pickup device; and
   correcting the output level ratio between the first and second color signals generated respectively in the first and second layers of the image pickup device in said step of photographing the main image, by using the correction data obtained in said step of operating the image pickup device in the calibration mode, wherein said operating step includes the step of periodically generating the correction data in the calibration mode before said photographing step performs the photographing of the main image.

5. A camera comprising:

an image pickup device which comprises a first layer including a photoelectric conversion unit that generates a first color signal and a second layer including a photoelectric conversion unit that generates a second color signal different in color from the first color signal, the first and second layers being arranged respectively at different depths from the surface of said image pickup device;

an illumination unit which illuminates said image pickup device;

a control unit which controls a calibration mode to cause said illumination unit to illuminate said image pickup device and obtain correction data from an output level ratio between the first and second color signals generated respectively in the first and second layers of said image pickup device illuminated by said illumination unit; and a correction unit which corrects the output level ratio between the first and second color signals generated respectively in the first and second layers of said image pickup device in a main photographing mode, by using the correction data obtained by said control unit in said calibration mode, wherein said control unit generates the correction data in said calibration mode within a time period from the time when an operation member for distance measurement is operated to the time when the main photographing is performed.

6. A control method of a camera which comprises an image pickup device which comprises a first layer including a photoelectric conversion unit that generates a first color signal and a second layer including a photoelectric conversion unit that generates a second color signal different in color from the first color signal, the first and second layers being arranged respectively at different depths from the surface of said image pickup device, and an illumination unit which illuminates the image pickup region, said method comprising the steps of:

operating the image pickup device in a calibration mode to cause the illumination unit to illuminate the image pickup device and obtain correction data from an output level ratio between the first and second color signals generated respectively in the first and second layers of the image pickup device illuminated by the illumination unit by;

photographing a main image by use of the image pickup region; and correcting the output level ratio between the first and second color signals generated respectively in the first and second layers of the image pickup device in said step of photographing the main image, by using the correction data obtained in said step of operating the image pickup device in the calibration mode, wherein said calibration operating step includes generating the correction data within a time period from the time when an operation member for distance measurement is operated to the time when the photographing of the main image is performed.

\* \* \* \* \*

UNITED STATES PATENT AND TRADEMARK OFFICE
CERTIFICATE OF CORRECTION

PATENT NO. : 7,382,497 B2
APPLICATION NO. : 10/404329
DATED : June 3, 2008
INVENTOR(S) : Yusuke Shirakawa It is certified that error appears in the above-identified patent and that said Letters Patent is hereby corrected as shown below:

COLUMN 1
Line 36, "pick up" should read --pickup--.
Line 57, "an photographing" should read --a photographing--.

COLUMN 2
Line 59, "differs" should read --differ--.

COLUMN 3
Line 19, "cannot obtained" should read --cannot be obtained--.
Line 56, "further" should read --a further--.

COLUMN 4
Line 4, "Still" should read --A still--.

COLUMN 5
Line 10, "element an" should read --element, a--.

COLUMN 7
Line 48, "to operated" should read --to be operated on--.

COLUMN 12
Line 13, "device:" should read --device;--.

COLUMN 14
Line 18, "unit by;" should read --unit;--.

Signed and Sealed this

Twentieth Day of January, 2009

JON W. DUDAS
*Director of the United States Patent and Trademark Office*